United States Patent
Dorschky et al.

(10) Patent No.: US 7,095,817 B2
(45) Date of Patent: Aug. 22, 2006

(54) METHOD AND APPARATUS FOR COMPENSATING FOR TIMING VARIANCES IN DIGITAL DATA TRANSMISSION CHANNELS

(75) Inventors: Claus Dorschky, Eckental (DE); Theodor Kupfer, Feucht (DE); Paul Presslein, Ebernmaunstadt (DE)

(73) Assignee: CoreOptics, Inc., Nuremberg (DE)

( * ) Notice: Subject to any disclaimer, the term of this patent is extended or adjusted under 35 U.S.C. 154(b) by 727 days.

(21) Appl. No.: 10/138,212

(22) Filed: May 3, 2002

(65) Prior Publication Data
US 2002/0179938 A1  Dec. 5, 2002

Related U.S. Application Data

(60) Provisional application No. 60/288,375, filed on May 3, 2001.

(51) Int. Cl.
*H04B 7/00* (2006.01)

(52) U.S. Cl. .................. 375/356; 375/371; 370/517; 713/503

(58) Field of Classification Search .............. 375/356, 375/358, 371, 373, 375, 376; 327/153, 161; 370/516, 517; 713/375, 400, 503, 600
See application file for complete search history.

(56) References Cited

U.S. PATENT DOCUMENTS

| | | | |
|---|---|---|---|
| 5,568,526 A * | 10/1996 | Ferraiolo et al. | 375/356 |
| 6,232,806 B1 * | 5/2001 | Woeste et al. | 327/149 |
| 6,516,040 B1 * | 2/2003 | Lecourtier et al. | 375/356 |

* cited by examiner

*Primary Examiner*—Young T. Tse
(74) *Attorney, Agent, or Firm*—Edwards Angell Palmer & Dodge; Howard M. Gitten

(57) ABSTRACT

A high-speed digital interface circuit for use with an N bit digital data signal is disclosed. The circuit comprises a source device that initially receives the N bit digital data signal, and a sink device that receives the N bit digital data signal from the source device. The N bit digital data signal has a skew when received by the sink device. A skew detection circuit in the sink device detects the skew in the N bit digital data signal and generates a skew detection signal. A line supplies the skew detection signal to the source device. A compensation circuit in the source device receives the skew detection signal and compensates for the skew in the N bit digital data signal.

21 Claims, 15 Drawing Sheets

REF

→ Time

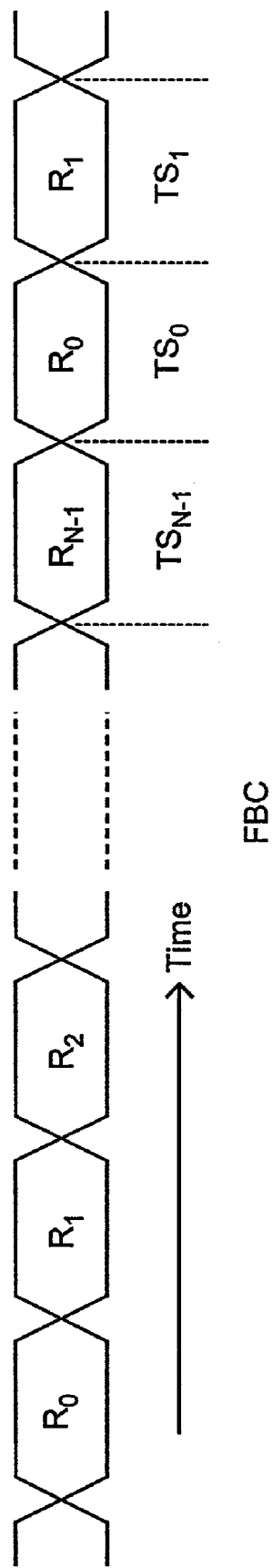
FIG. 4
FIG. 5

METHOD AND APPARATUS FOR COMPENSATING FOR TIMING VARIANCES IN DIGITAL DATA TRANSMISSION CHANNELS

CROSS REFERENCE TO RELATED APPLICATIONS

Priority is claimed from provisional application Ser. No. 60/288,375, filed May 3, 2001.

FIELD OF THE INVENTION

This invention relates to a high-speed digital circuit, and more particularly, to a method and apparatus for adjusting for skew in digital data signals transmitted between devices in a digital interface circuit.

BACKGROUND OF THE INVENTION

A high speed digital interface circuit typically has two independent devices, called a "source" device and a "sink" device, that communicate with each other across a bus having multiple data signal lines or channels. Individual data bits forming a digital data signal, when transmitted along the bus, take a different amount of time to reach the other end. The time difference between the "fastest" bit and the "slowest" bit is the bus's maximum delay skew. Excessive skew is problematic because it results in timing problems for signals intended for virtually simultaneous arrival.

Data rates of 2.5 Gb/s and higher are used between the source and the sink devices in high-speed optical interfaces. Since skew is a significant problem in a high-speed optical interface, a special skew correction circuit is often implemented in the sink device in order to compensate. Currently available technologies, which are capable of processing data at a speed up to 40 Gb/s, do not allow complex circuits (or multiplexing devices) to be constructed, thereby limiting the types of circuits that can be used to compensate for skew. In some instances, the source device and the sink device are implemented in different technologies, further limiting the opportunities for skew correction. The sink device can even be implemented in a technology that does not allow high complexity, even further limiting the circuits that can be used to compensate for skew.

SUMMARY OF THE INVENTION

In accord with the present invention, the skew in the bits of a digital data signal transmitted through an interface with a source device and a sink device is detected in the sink device and compensated for in the source device. The phase detection data for the individual channels of the digital data signal are fed back from the sink device to the source device as a multiplexed signal. A circuit in accord with the invention allows a larger number of data transfer approaches to be used in the sink device, as the circuit can be relatively simpler than in the prior art. This flexibility allows the system to be optimized for cost and performance. A circuit of the present invention is particularly suited for use in a high-speed optical transmission system such as a synchronous optical network (SONET), a key packet router or a dense wave division multiplexing (DWDM) system.

A circuit in accord with the invention allows an interface to be constructed for use with a high complexity source device and a low complexity sink device. Such a circuit allows an interface to be constructed even where the technology of the source and sink devices would otherwise generate too high an amount of skew among the bits of the data signal.

In accord with the present invention, a high speed digital circuit for use with an N bit digital data signal includes a source device that initially receives the N bit digital data signal, and a sink device that receives the N bit digital data signal from the source device, with the N bit digital data signal having a skew when received by the sink device. A skew detection circuit in the sink device detects the skew in the N bit digital data signal and generates a skew detection signal. A line supplies the skew detection signal to the source device. A compensation circuit in the source device receives the skew detection signal and compensates for the skew in the N bit digital data signal.

Further in accord with the present invention, a method of correcting the skew in an N bit digital data signal transmitted between a source device and a sink device of an interface comprises the steps of measuring the skew in the sink device, generating a skew detection signal in the sink device, transmitting the skew detection signal from the sink device to the source device, and compensating for the skew in the source device in response to the skew detection signal.

Still further in accord with the present invention, a high speed digital interface circuit for use with an N bit digital data signal comprises a source device, a sink device, and an N bit bus connecting the source device and the sink device, where the N bit digital data signal is received at the sink device with a skew. The source device comprises N variable delay units, each of the variable delay units individually controlled for each of the N bits, and a compensation circuit that compensates for the skew. The compensation circuit includes a counter circuit that supplies a reference signal to the sink device, an AND gate coupled to the counter circuit, and N low pass filters. Each of the low pass filters is coupled to one of the N variable delay units and to the AND gate. The sink device comprises N phase detectors, each of the phase detectors individually controlled for each of the N bits by the reference signal, N analog to digital converters coupled to the N phase detectors, and a skew detection circuit that detects the skew in the N bit digital data signal and generates a skew detection signal. The skew detection circuit includes a counter circuit that receives the reference signal from the source device, and an AND gate coupled to the counter circuit. A line supplies the skew detection signal from the sink device to the source device, and another line supplies the reference signal from the source device to the sink device.

BRIEF DESCRIPTION OF THE DRAWINGS

FIG. 4 is a timing diagram for a feedback signal of the circuit of FIG. 2;

FIGS. 5, 5A, 5B are detailed schematic diagrams of a second embodiment of a circuit in accord with the present invention;

FIGS. 6, 6A, 6B are detailed schematic diagrams of a third embodiment of a circuit in accord with the present invention;

FIGS. 8, 8A, 8B are detailed schematic diagrams of a fourth embodiment of a circuit in accord with the present invention;

DETAILED DESCRIPTION OF THE PREFERRED EMBODIMENTS

Figure 1:
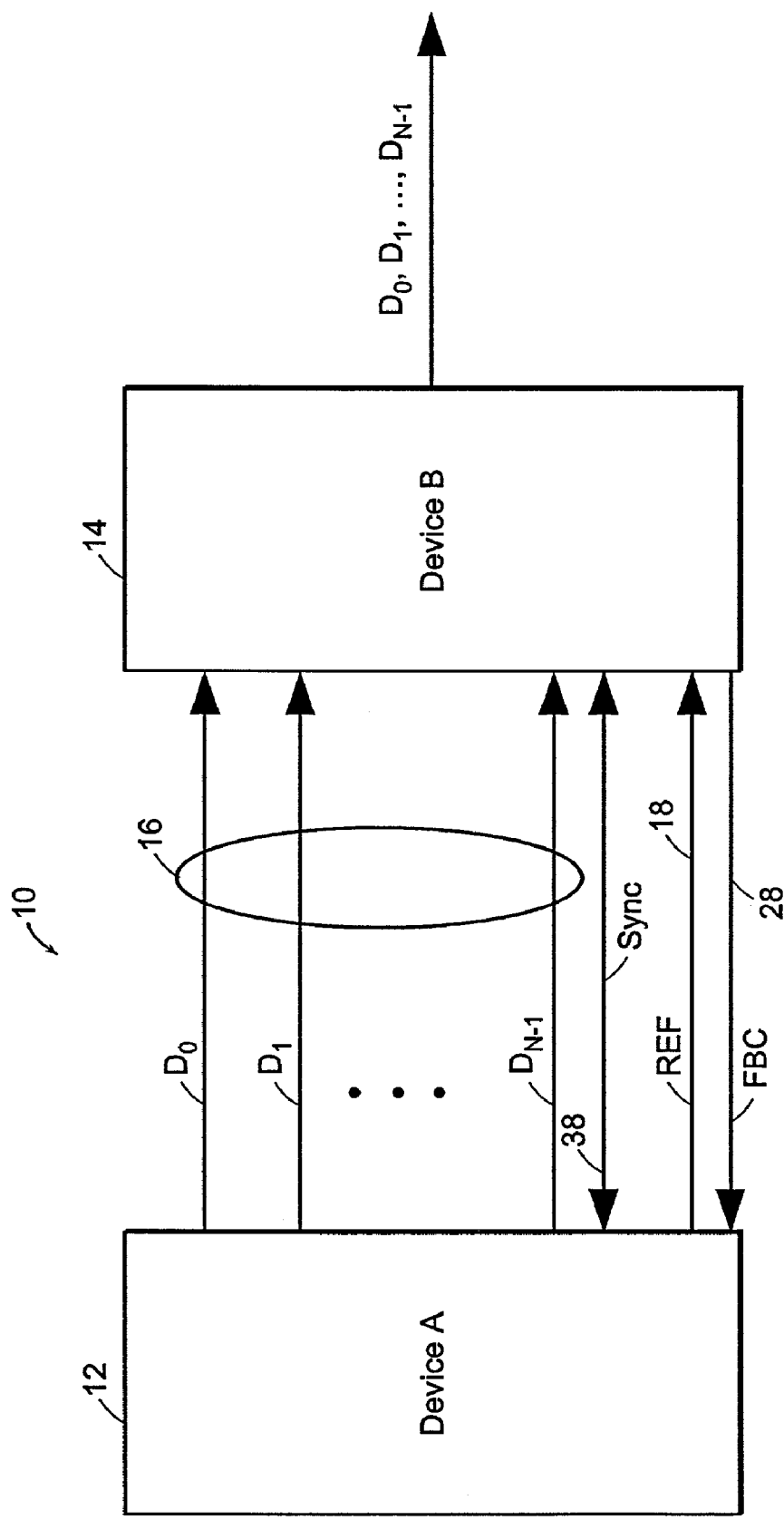
FIG. 1 is schematic diagram of a circuit in accord with the present invention.

Referring to the drawings, and initially to FIG. 1 thereof, a digital circuit 10 in accord with the present invention includes a source device A 12 coupled to a sink device B 14 by a multi-line data bus 16. The source device 12, which may be constructed with a high degree of complexity, transmits N parallel bits of a digital data signal D along the bus 16 to the sink device 14, which may be constructed with a degree of low complexity. The digital circuit 10 may be, for example, a high-speed transmission interface in the GHz range that transmits a digital data signal D between the two integrated circuits 12, 14. In the illustrated embodiment, the digital circuit 10 serializes the N bit digital data signal D, and the N bits thereof are referred to herein as $D_i$, i=0, ... N−1. The digital circuit 10 may, of course, process the digital data signal D in some other way. A single-bit reference line 18 supplies a reference signal REF, which provides a timing reference, from the source device 12 to the sink device 14, as discussed more fully in connection with FIG. 3. The reference signal REF is, in the most common instance, a clock signal. Also as discussed more fully hereinbelow, the sink device 14 detects the skew in the bits $D_i$ of the digital data signal D as received, calculates a skew detection signal, and transmits the skew detection signal to the source device 12. The source device 12 then compensates for the skew in the digital data signal D. The phase detection data for the individual channels of the digital data signal in the skew detection signal are fed back from the sink device 14 to the source device 12 as a multiplexed signal.

The data bits $D_0$ to $D_{N-1}$ of the digital data signal D have a frequency of f bits-per-second, and are considered to be a continuous data stream. The transmission order of the N data bits $D_0$ to $D_{N-1}$ is defined by:

$$D_{0;m}, D_{1;m}, \ldots, D_{N-1;m}, D_{0;m+1}, D_{1;m+1}, \ldots, D_{N-1;m+1},$$

where m is the $m^{th}$ set of N data bits in time, and (m+1) is the $(m+1)^{th}$ set of N data bits in time.

Figure 2:
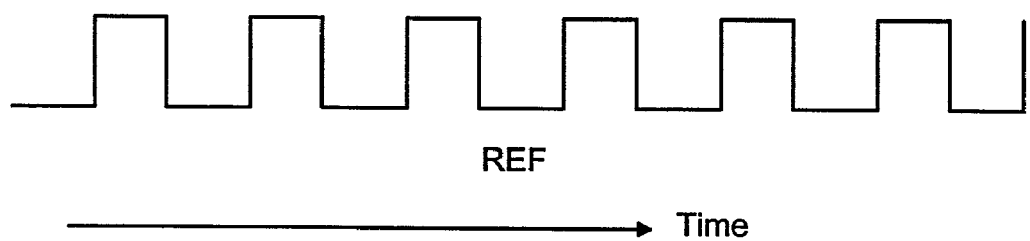
FIG. 2 is a timing diagram for a reference signal of the circuit of FIG. 1.

The reference line 18 carries characteristic timing information to allow for phase/delay detection, but is not part of the data stream of digital data signal D. The reference signal REF may, in one advantageous embodiment, be an alternating high-low sequence of bits having a frequency of f bits-per-second. Such a reference signal REF allows a phase detection of one (1) unit interval (UI). FIG. 2 depicts one example of the reference signal REF.

Figure 3:
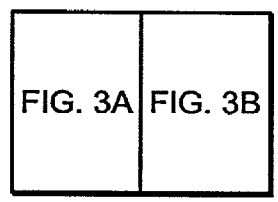
FIGS. 3, 3A, 3B are detailed schematic diagrams of a first embodiment of a circuit in accord with the present invention.
Figure 3A:
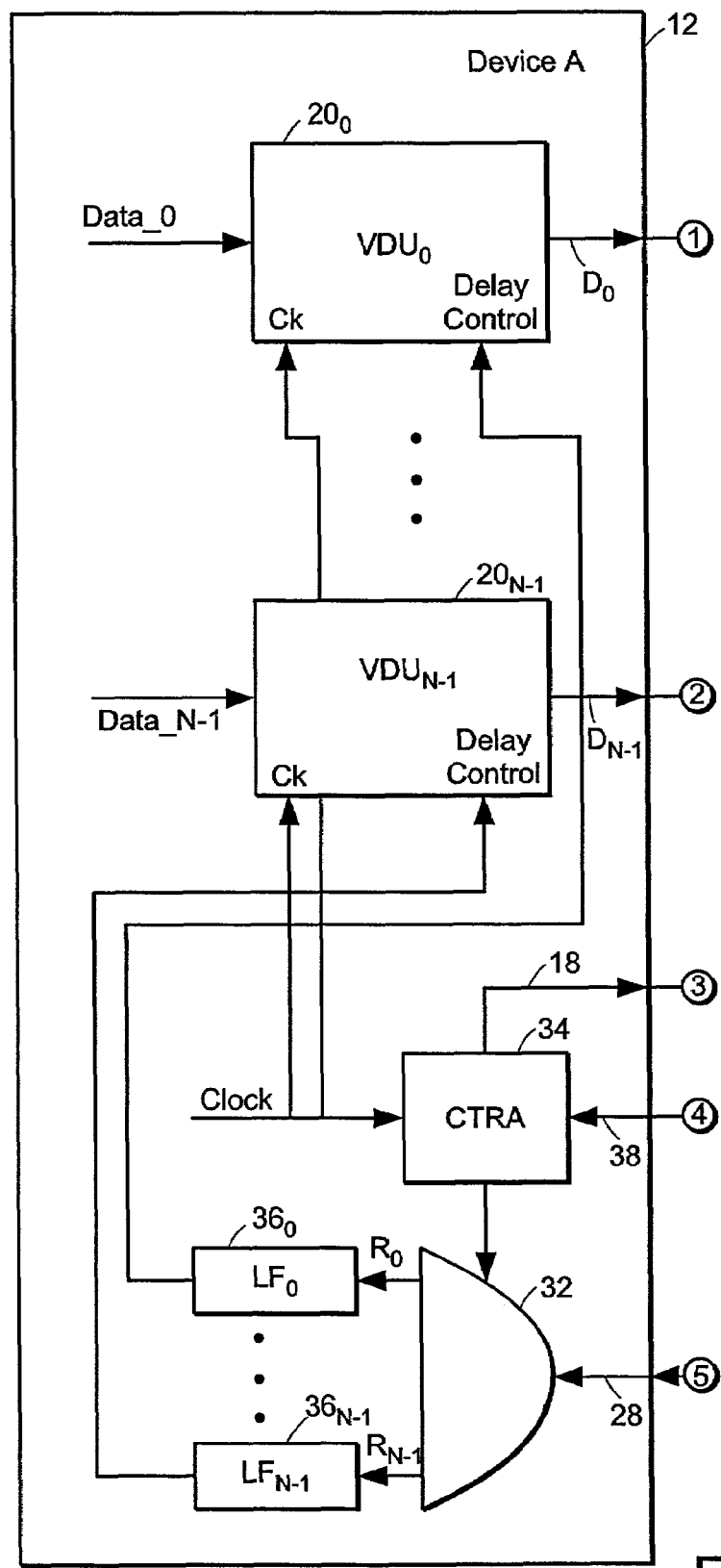
Figure 3B:
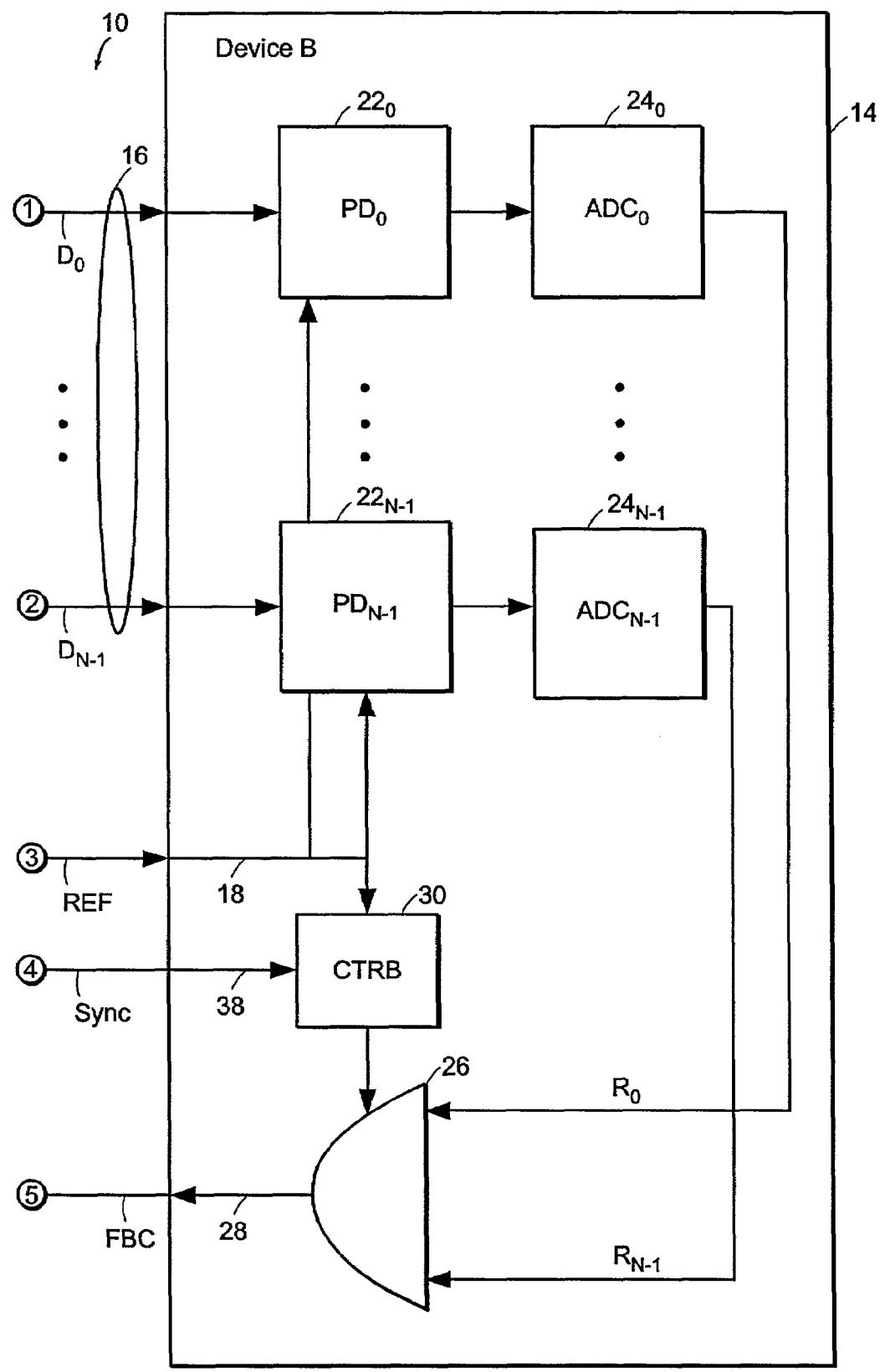

FIGS. 3, 3A, 3B depict the digital circuit 10 of FIG. 1 in more detail. The original digital data signal with bits identified as Data_I, i=0, ... N−1, is supplied to the source device 12 to variable delay units $20_0, \ldots 20_{N-1}$ ($VDU_i$, i=0, ... N−1). Each variable delay unit $20_0, \ldots 20_{N-1}$ is individually controlled for each data line bearing the data bits $D_i$. Each bit $D_i$ on the data line for the digital data signal D during transmission from the source device 12 to the sink device 14 experiences an individual delay $T_i$, i=0, ... N−1, from the connection between the source device 12 and the sink device 14. A phase detector $22_0, \ldots 22_{N-1}$ ($PD_i$, i=0, ... N−1) (FIG. 3B) in the sink device 14 detects the delay $T_i$ for each individual bit $D_i$ by comparing the phase of the bit $D_i$ with the phase of the reference signal REF. N analog to digital converters $24_0, \ldots 24_{N-1}$ convert the results of the phase comparisons in the phase detectors $22_0, \ldots 22_{N-1}$ into a digital signal R, whose constituent bits are identified herein as $R_i$, i=0, ... N−1. The digital signal R from the phase comparison is supplied to an AND gate 26 and thence, as a feedback signal or channel FBC (see FIG. 4) along the line 28 to the source device 12. The feedback signal FBC may be supplied in a time-shared manner to the source device 12. That is, each bit $R_i$ may be awarded or assigned to a dedicated time slot $TS_i$, i=0, ... N−1. A counter 30 (CTRB) in the sink device 14 controls the time slot sharing. Each bit $R_i$ is assigned in a round robin fashion in the feedback signal FBC.

The source device 12 receives the feedback signal FBC in an AND gate 32, where the bits $R_i$ are extracted and assigned to the channels i, i=0, ... N−1, under control of a counter 34 (CTRA). The bits $R_i$ are supplied from the AND gate 32 through N individual loop filters $36_0, \ldots 36_{N-1}$ ($LF_i$, i=0, ... N−1). The filtered digital signal from the loop filters $36_0, \ldots 36_{N-1}$ are supplied as the control signals for the variable delay units $20_0, \ldots 20_{N-1}$.

The counters 34, 30 in the source device 12 and the sink device 14, respectively, must be synchronized in order to assign the information for the bits $R_i$ to the correct data channel corresponding to the bits $D_i$. A preferred way is to make counter 34 a slave to counter 30, and provide a separate synchronization line 38 connecting the counters 34, 30. Other means of synchronizing the counters 30, 34 will be described hereinbelow.

It will be appreciated from the above description that the digital circuit 10 includes N data lines that are delay compensated, and that each line is individually delay compensated. The reference line 18 carrying the reference signal REF provides a timing reference from the source device 12 to the sink device 14. The feedback signal or channel FBC from the source device 12 to the sink device 14 provides information about the individual channel delays, or phase offsets, when the feedback signal or channel FBC is used in a time-shared manner between the individual data channels. It will also be appreciated that the source device 12 implements the delay compensation and control of the delay compensation to compensate for skew in the digital data signal D, and that this is the more complex part of the circuitry used to compensate for skew. The sink device 14, by contradistinction, implements the phase detection or measurement between the data line and the reference line, which is the less complex portion of the circuitry.

FIG. 5 illustrates an alternate embodiment of a digital circuit 110 of the present invention that can operate in two distinctive conditions. The digital circuit 110 may be operated in an initialization condition, in which the circuit 110 is first energized and the components thereof initialized, or in an operating condition, in which the circuit 110 operates and performs as hereinbefore described in connection with circuit 10. The elements of the circuit 110 that have the same function as the elements of FIG. 3 bear the same reference numerals for ease of understanding. The primary difference between circuit 110 and circuit 10 is the incorporation of an AND gate as an input to each VDU for making use of an initialization signal.

Specifically, in the initialization condition, an initialization digital data signal DetPat is supplied on the data channels or lines corresponding to the bits $D_i$ and the signal on the reference line or channel 18. The initialization digital data signal DetPat has a deterministic pattern of defined length that allows detection and compensation for delay variations of more than one unit interval (UI). In this instance, of course, the unit interval of the initialization digital data signal DetPat is greater than the unit interval of the digital data signal D, that is, UI.

Figure 5A:
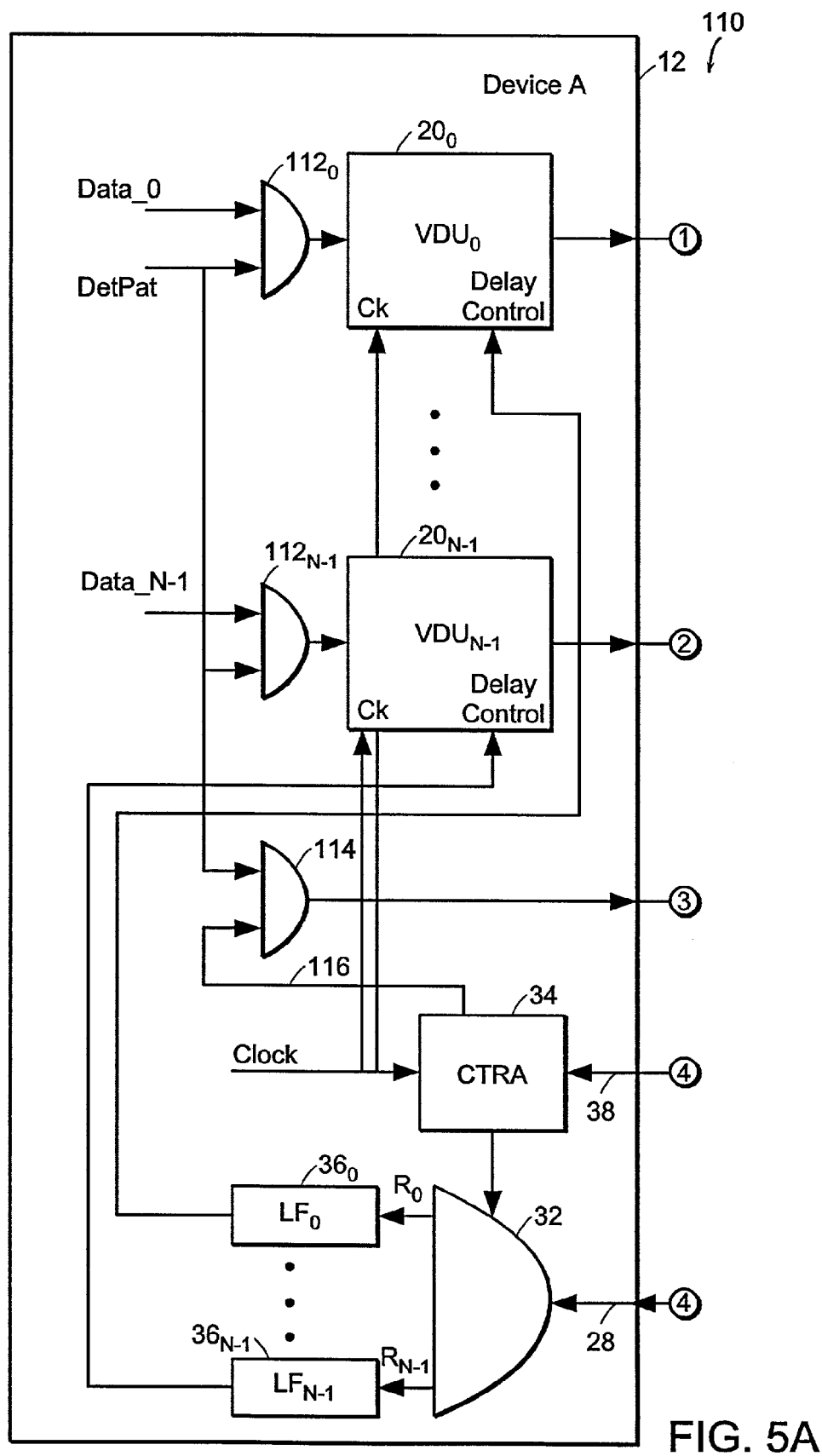
Figure 5B:
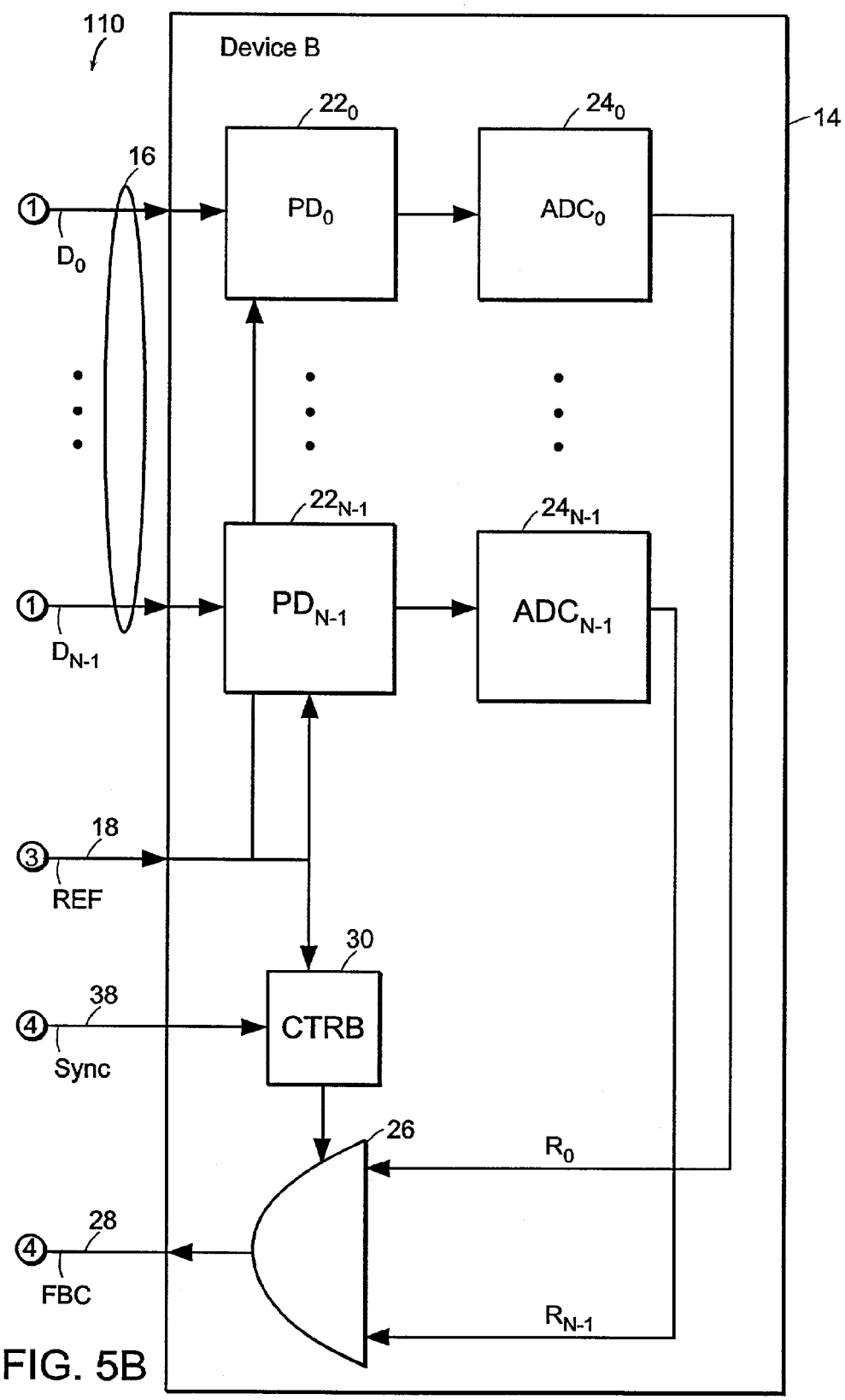

In the circuit 110 of FIGS. 5, 5A, 5B, each bit Data_i, i–0, ... N–1, of the original digital data signal is supplied through an AND gate $112_0, \ldots, 112_{N-1}$ before being supplied to the associated variable delay unit $20_0, \ldots, 20_{N-1}$. The initialization digital data signal DetPat is also supplied to the AND gates $112_0, \ldots, 112_{N-1}$, and through an AND gate 114 to the reference line 18. The output of the counter 34 is also supplied along line 116 to the AND gate 114. The maximum delay, or phase offset, to be compensated is then determined only by the amount of the delay introduced by the variable delay units $20_0, \ldots, 20_{N-1}$ and the type of initialization digital data signal DetPat.

If the circuit 110 is switched back into the operating condition, an "undefined" digital data signal resets the detection interval to one (1) UI. The variable delay units $20_0, \ldots, 20_{N-1}$ determine the compensation range, however, as hereinbefore described.

Figure 6A:
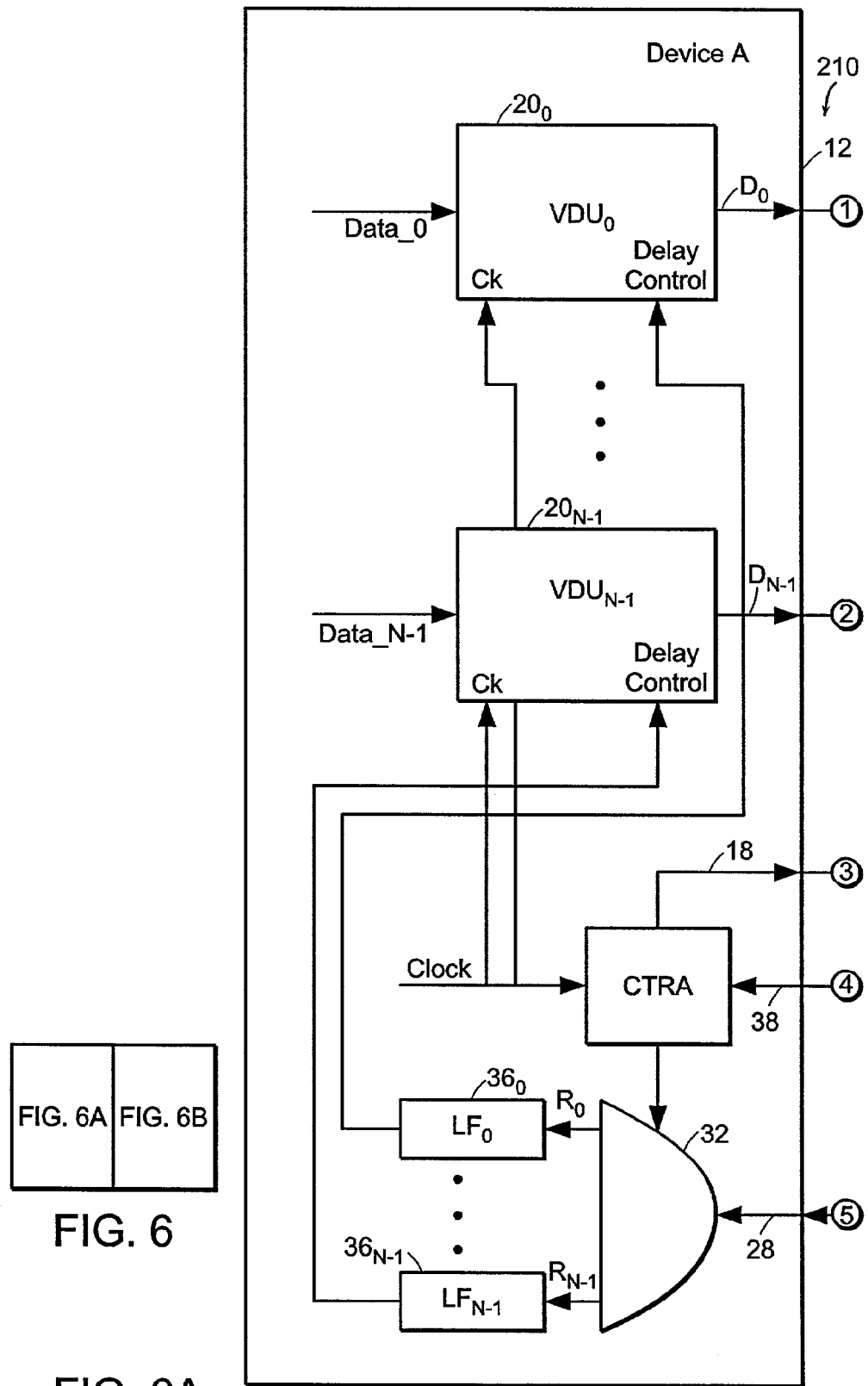
Figure 6B:
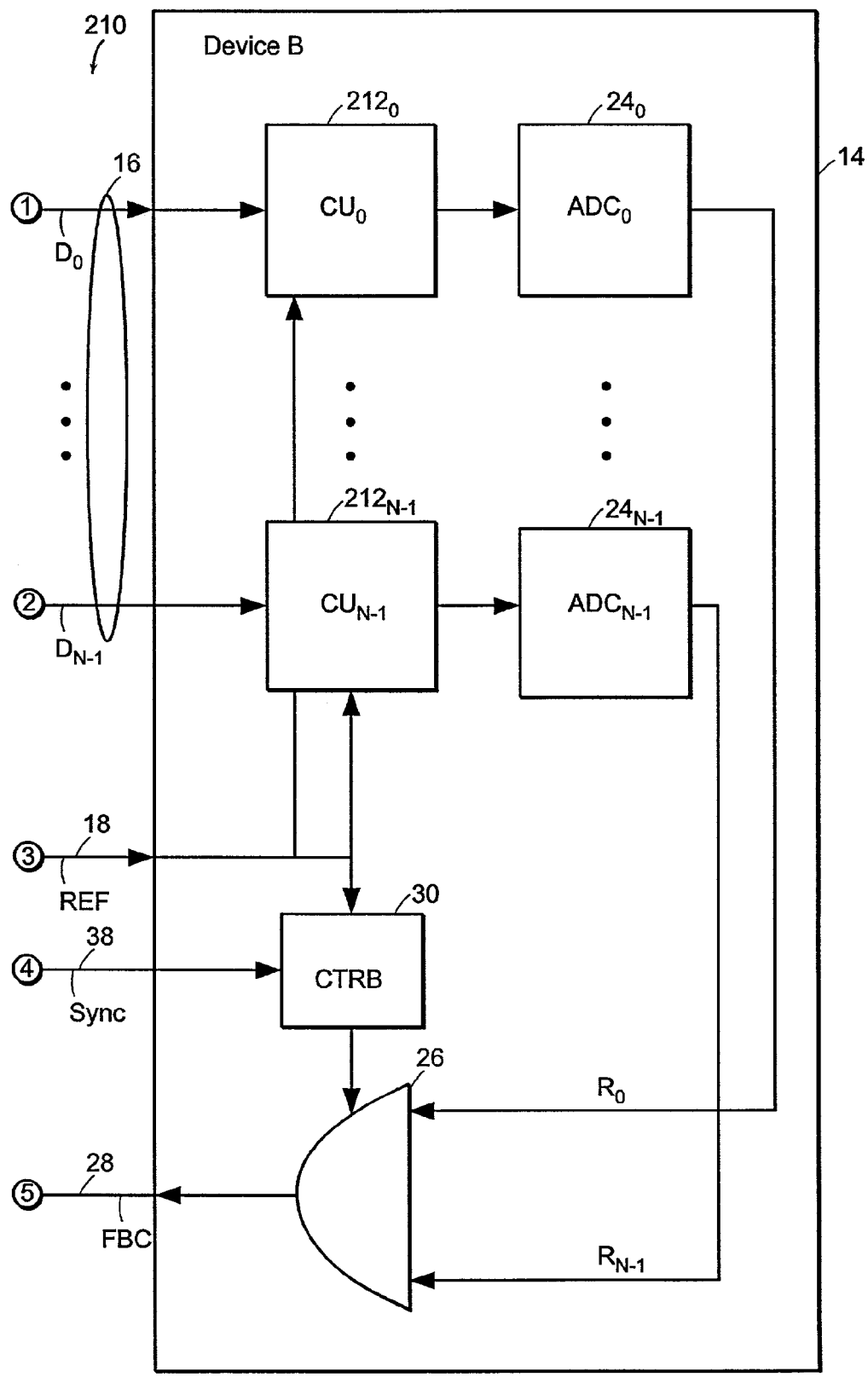
Figure 7:
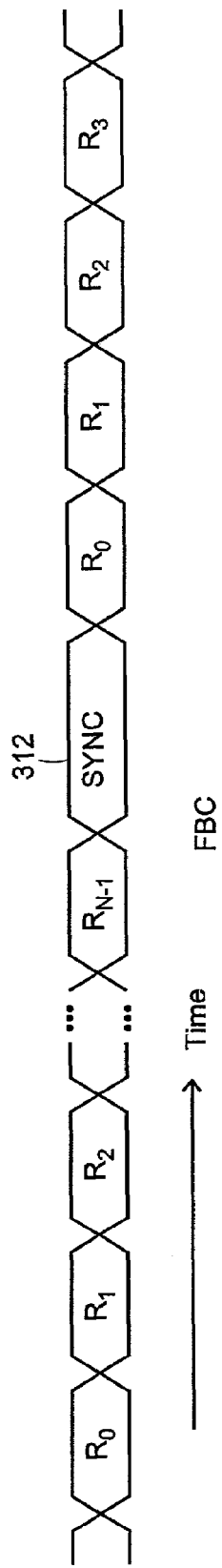
FIG. 7 is a timing diagram for a feedback signal of the circuit of FIG. 6.
Figure 8A:
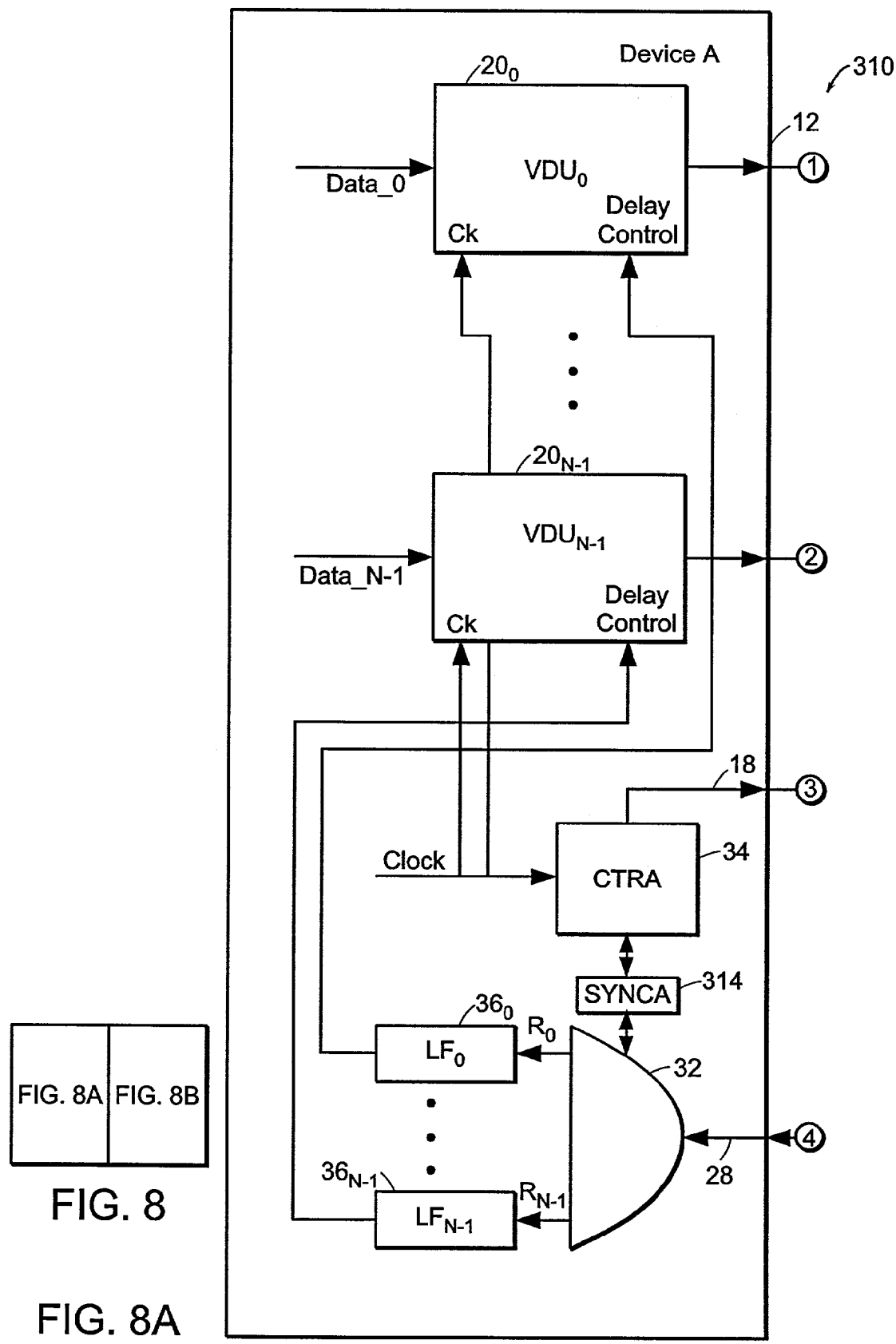
Figure 8B:
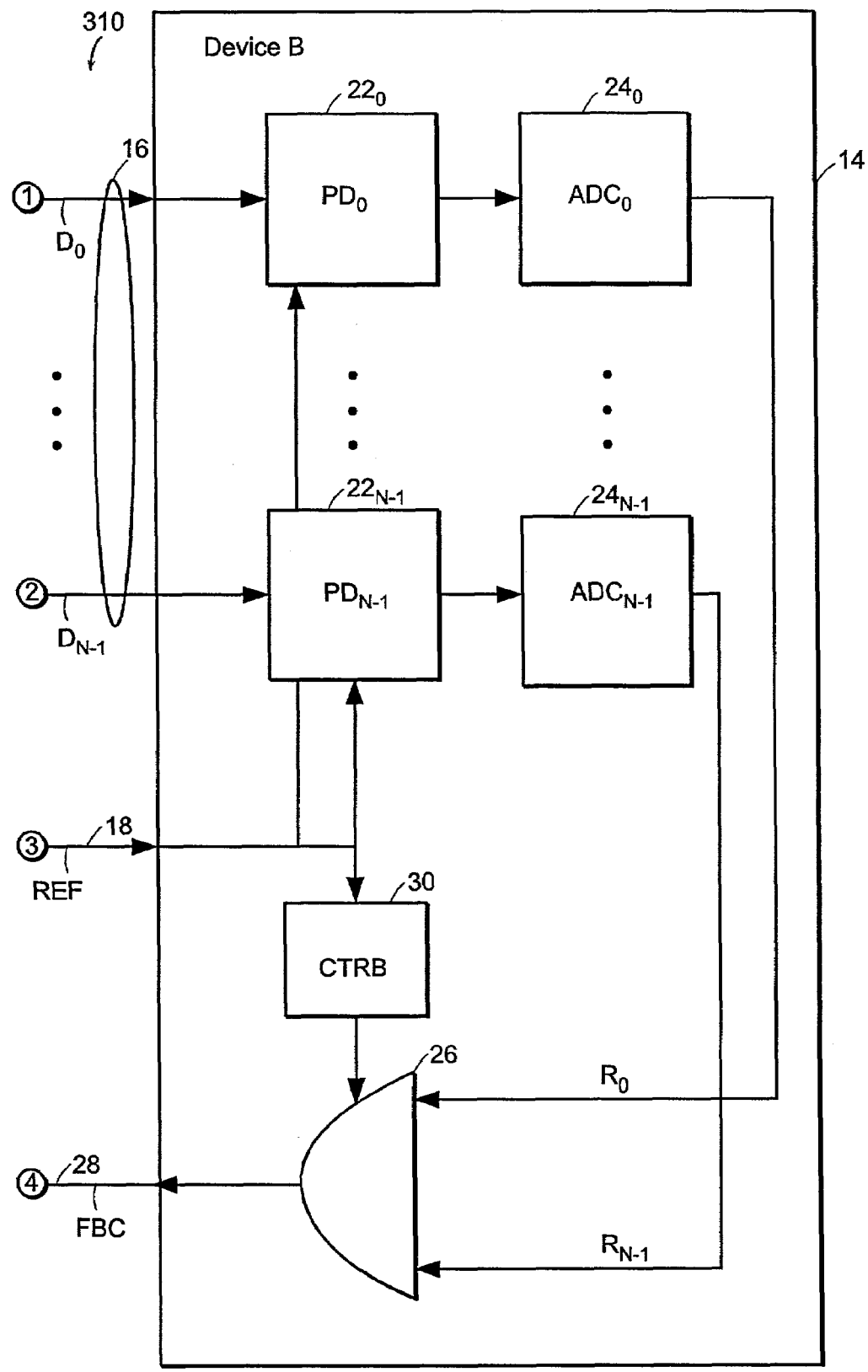

FIGS. 6, 6A, 6B illustrate a third embodiment of a digital circuit 210 in accord with the present invention. Again, like numerals are utilized to indicate like structure, the primary difference being the incorporation of a correlator unit in the sink. Specifically, in the circuit 210, the reference line 18 may carry a more complex pattern than the alternating sequence of high-low transitions of FIG. 2. The complex pattern of the reference signal REF has a defined correlation to the data lines. In this embodiment, N correlator units $212_0, \ldots, 212_{N-1}$ replace the N phase detectors $22_0, \ldots 22_{N-1}$. The N correlator units $212_0, \ldots 212_{N-1}$ detect the delay between the bits $D_i$ and the reference signal REF.

FIGS. 7, 8, 8A and 8B illustrate a fourth embodiment of a circuit 310 according to the present invention in which a synchronization signal SYNC is inserted in the feedback channel or signal FBC. Again, like numerals are used to indicate like structures for ease of description. The primary difference between circuit 310 and circuit 10 being the inclusion of a sync unit in the source device. Specifically, in this embodiment, the counter 30 inserts a sync pattern SYNC into a dedicated time slot 312. A sync unit SYNCA 314 in the source device 12 detects the sync pattern SYNC at AND gate 32. The sync unit 314 is coupled to the AND gate 32 and the counter 34. The sync unit 314 accordingly synchronizes the counter 34 in the source device 12 with the counter 30 in the sink device 14. It is to be noted that the circuit 310 does not have a synchronization line 38 as depicted in the previously described circuits.

Figure 9:
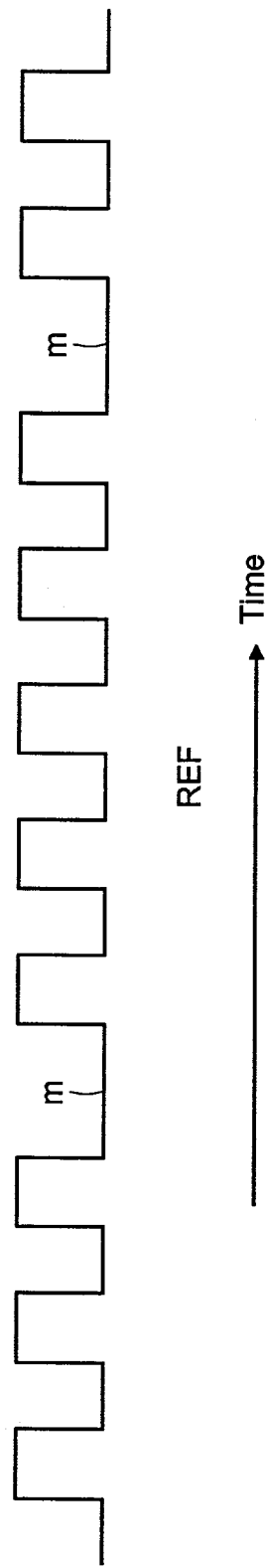
FIG. 9 is a timing diagram for a reference signal in accord with the present invention.

FIG. 9 illustrates a timing diagram used in connection with one embodiment of the present invention. In this embodiment, synchronization information is sent along the reference line 18, that is, within the reference signal REF. A preferred manner of inserting the synchronization information may be achieved by inserting a discontinuity in the reference signal REF that the counter 30 can detect, but which does not have a negative influence on the phase detection that occurs in the phase detectors $22_0, \ldots 22_{N-1}$. If the reference signal REF carries an alternating high-low pattern, as illustrated in FIG. 2, a suitable discontinuity may be the insertion of a single missing high-low transition m.

Figure 10:
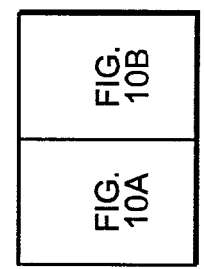
FIGS. 10, 10A, 10B are detailed schematic diagrams of a fifth embodiment of a circuit in accord with the present invention.
Figure 10A:
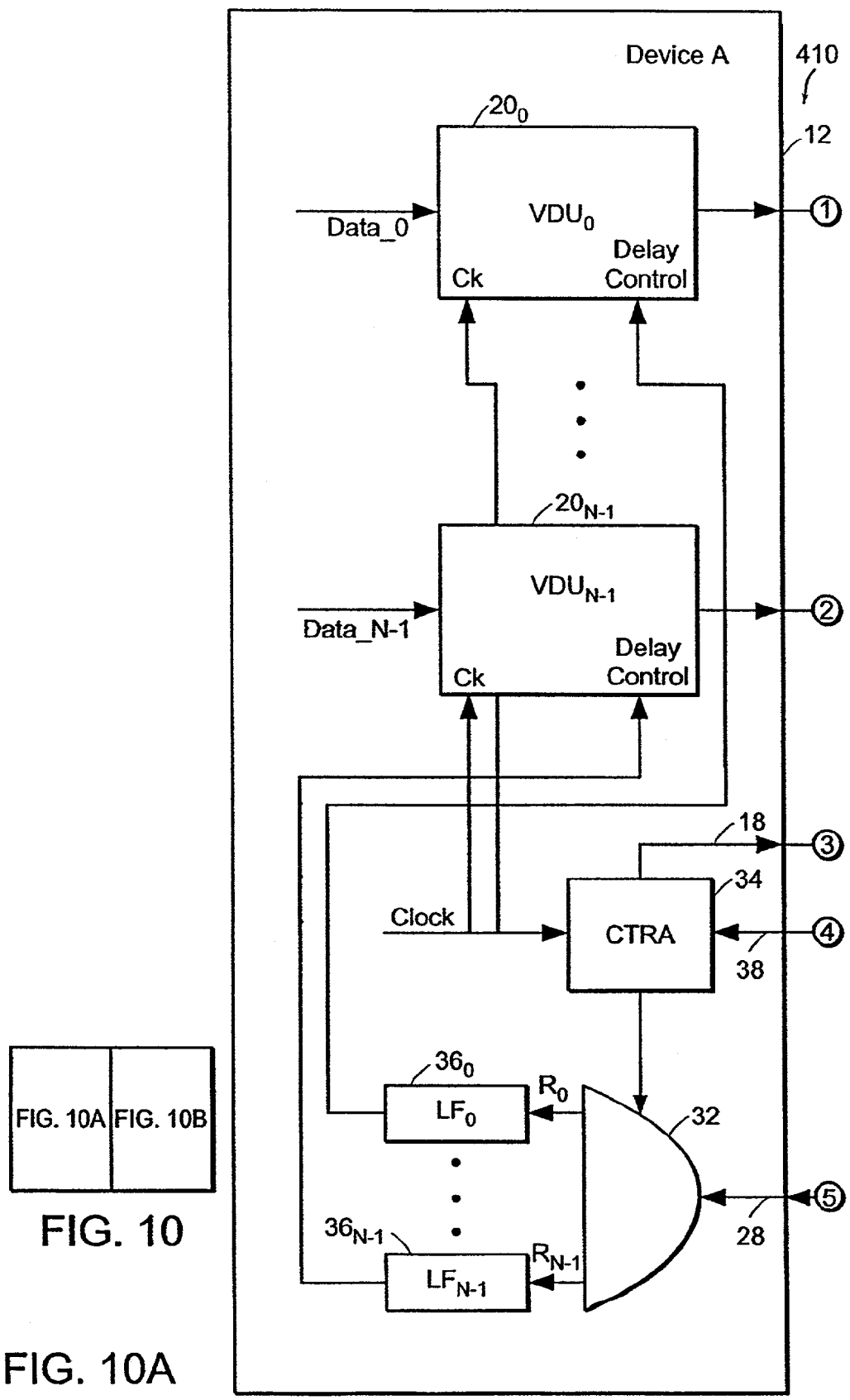
Figure 10B:
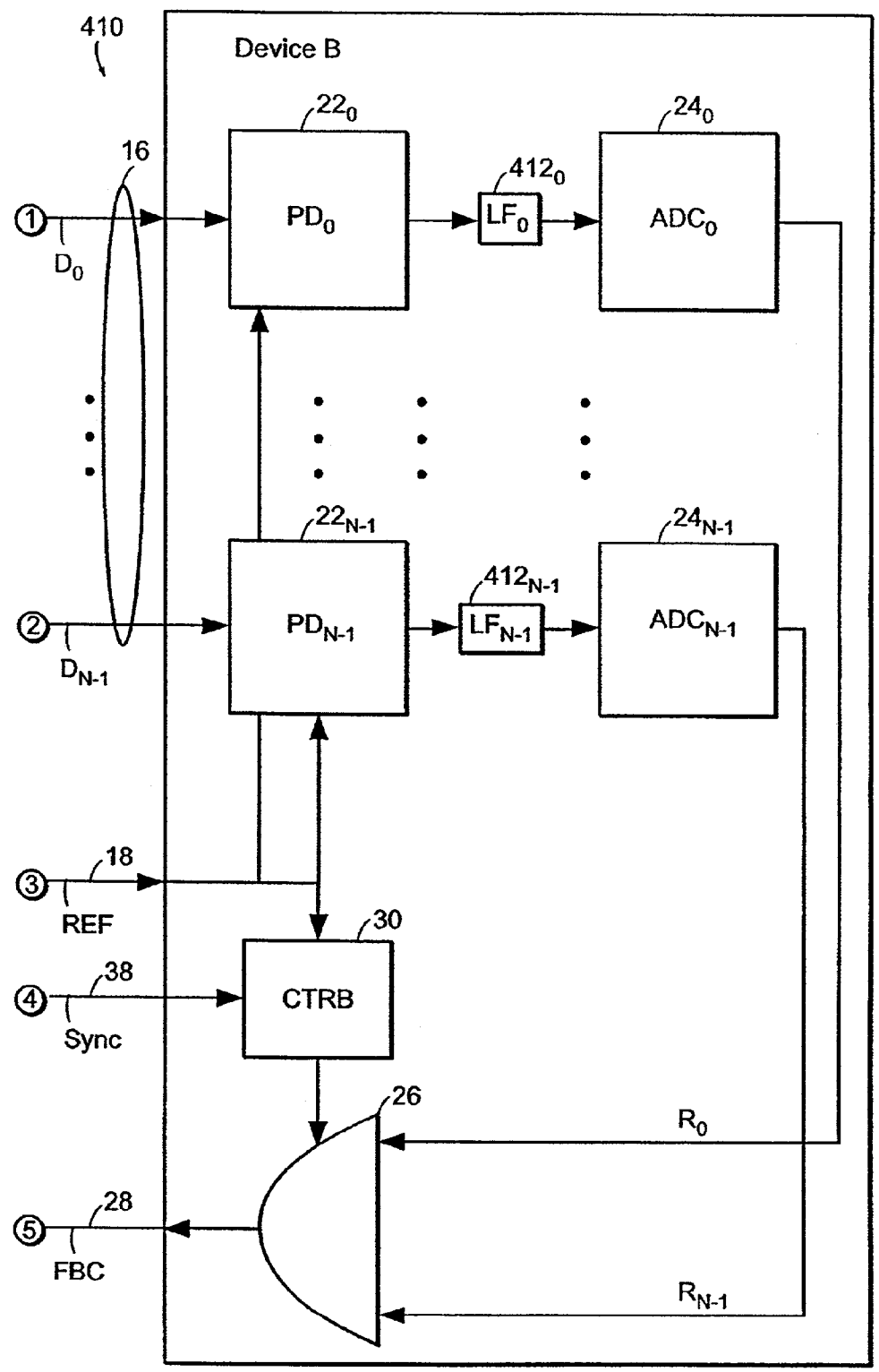

FIGS. 10, 10A, 10B illustrates a fifth embodiment of a digital circuit 410 in accord with the present invention. Again, like numerals are utilized to indicate like structure for ease of description, the primary difference between circuit 10 and circuit 410 being the inclusion of a low pass filter in the sink. In this embodiment, a low pass filter ($LF_j$, l=0, ... N–1) $412_0, \ldots, 412_{N-1}$ (FIG. 10B) is inserted between the phase detectors $22_0, \ldots 22_{N-1}$ and the analog to digital converters $24_0, \ldots, 24_{N-1}$ to suppress anti-aliasing effects.

It will be appreciated that the present invention allows relaxed timing requirements for the source device 12, and less complexity at the sink device 14.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

The invention claimed is:

1. A high speed digital circuit for use with an N bit digital data signal, where N is an integer, comprising:
   a. a source device for receiving said N bit digital data signal;
   b. a sink device coupled to said source device and receiving said N bit digital data signal from said source device, said N bit digital data signal having a skew when received by said sink device;
   c. a skew detection circuit in said sink device for detecting said skew in said N bit digital data signal and generating a skew detection signal; said skew detection circuit including a circuit for detecting the skew of each of N bits in said N bit digital data signal, generating N phase detection signals in response thereto, and multiplexing said N phase detection signals as said skew detection signal;
   d. a compensation circuit in said source device for receiving said skew detection signal and compensating for said skew in said N bit digital data signal in response thereto; and
   said source device outputs a reference signal to said sink device, said reference signal having timing information for phase and delay detection of said skew in said N bit digital data signal.

2. A high speed digital circuit for use with an N bit digital signal, where N is an integer, comprising:
   a. a source device for receiving said N bit digital data signal;
   b. a sink device coupled to said source device and receiving said N bit digital data signal from said source device, said N bit digital data signal having a skew when received by said sink device;
   c. a skew detection circuit in said sink device for detecting said skew in said N bit digital data signal and generating a skew detection signal; and
   d. a compensation circuit in said source device for receiving said skew detection signal and compensating for said skew in said N bit digital data signal in response thereto;
   said source device outputs a reference signal to said sink device, said reference signal having timing information for phase and delay detection of said skew in said N bit digital data signal,
   said source device includes N variable delay units for outputting said N bits, each of said variable delay units associated with and individually controlled by a respective one bit of a phase comparison signal.

3. The circuit of claim 2, wherein said source device includes a counter circuit for supplying said reference signal to said sink device.

4. The circuit of claim 3, wherein said source device includes a delay control circuit for supplying said phase comparison signal as a control signal to said N variable delay units.

5. The circuit of claim 4, wherein said source device includes N low pass filters, each of said low pass filters coupled to one of said N variable delay units, said N low pass filters being disposed between said delay control circuit and said N variable delay units.

6. The circuit of claim 5, wherein said sink device includes N phase detectors for outputting a phase comparison in response to a respective one of said N bits and said reference signal.

7. The circuit of claim 6, wherein said sink device includes a counter circuit for receiving said reference signal from said source device.

8. The circuit of claim 7, wherein said sink device includes a skew signal circuit coupled to said counter circuit and said N phase detectors for supplying said skew detection signal to said source device.

9. The circuit of claim 8, wherein said sink device includes N analog to digital converters coupled to said N phase detectors and said skew signal circuit.

10. The circuit of claim 9, and further comprising a line for supplying said synchronization signal between said counter circuits in said source device and said sink device.

11. The circuit of claim 10, wherein said sink device includes N low pass filters, each of said low pass filters connected between one of said N phase detectors and one of said N analog to digital converters.

12. A high speed digital circuit for use with an N bit digital data signal, where N is an integer, comprising:
    a. a source device for receiving said N bit digital data signal;
    b. a sink device coupled to said source device and receiving said N bit digital data signal from said source device, said N bit digital data signal having a skew when received by said sink device;
    c. a skew detection circuit in said sink device for detecting said skew in said N bit digital data signal and generating a skew detection signal;
    d. a compensation circuit in said source device for receiving said skew detection signal and compensating for said skew in said N bit digital data signal in response thereto,
    said high speed digital circuit operating in an initialization condition in which a digital initialization signal having bits of a first predefined unit length initializes said high speed digital circuit, and in an operating condition in which N bits of said N bit digital data signal have a second predefined unit length, wherein said source device includes N AND gates for receiving said N bit digital data signal and said digital initialization signal to produce a gated N bit digital data signal, and variable delay units for receiving said gated N bit digital data signal and outputting an N bit data signal in response thereto, and wherein said first predefined unit length is greater than said second predefined unit length.

13. A high speed digital circuit for use with an N bit digital data signal, where N is an integer, comprising:
    a. a source device for receiving said N bit digital data signal;
    b. a sink device coupled to said source device and receiving said N bit digital data signal from said source device, said N bit digital data signal having a skew when received by said sink device;
    c. a skew detection circuit in said sink device for detecting said skew in said N bit digital data signal and generating a skew detection signal;
    d. a compensation circuit in said source device for receiving said skew detection signal and compensating for said skew in said N bit digital data signal in response thereto; and
    e. a line for supplying a reference signal from said source device to said sink device, said reference signal having timing information for phase and delay detection of said skew in said N bit digital data signal, and wherein said sink device includes N correlator units for detecting the delay between each of the N bits of said N bit digital data signal and said reference signal and outputting a phase detection signal.

14. A method of correcting the skew in an N bit digital data signal, N being an integer, transmitted between a source device and a sink device of an interface, comprising the steps of:
    a. measuring said skew in said N bit digital data signal in said sink device;
    b. generating a skew detection signal in said sink device;
    c. transmitting said skew detection signal from said sink device to said source device;
    d. compensating for said skew in said N bit digital data signal in said source device in response to said skew detection signal;
    e. supplying a reference signal from said source device to said sink device, said reference signal having timing information for phase and delay detection of said skew in said N bit digital data signal; and
    f. supplying a synchronization signal between said source device and said sink device; and
    said interface operating in an initialization condition and in an operating condition, and further comprising the steps of:
    g. transmitting, in said operating condition, said N bit digital data signal with bits having a first predefined unit length; and
    h. transmitting, in said initialization condition, a digital data signal with bits having a second predefined unit length, said second predefined unit length greater than said first predefined unit length.

15. A high speed digital interface circuit for use with an N bit digital data signal, where N is an integer, comprising:
    a. an N bit bus connecting a source device and a sink device, said N bit digital data signal being received at said sink device with a skew;
    b. said source device comprising;
        i. N variable delay units, each associated with one of N bits, and each of said variable delay units individually controlled for each of said N bits;
        ii. a compensation circuit for compensating for said skew, said compensation circuit including:
            1. a counter circuit for supplying a reference signal to said sink device;
            2. an AND gate coupled to said counter circuit; and
            3. N low pass filters, each associated with one of said N bits, and each of said low pass filters coupled to one of said N variable delay units and to said AND gate;

c. said sink device comprising:
   i. N phase detectors, each associated with one of said N bits, and each of said phase detectors individually controlled for each of said N bits by said reference signal;
   ii. N analog to digital converters, each associated with one of said N bits, coupled to said N phase detectors;
   iii. a skew detection circuit for detecting said skew in said N bit digital data signal and generating a skew detection signal, said skew detection circuit including:
      1. a counter circuit for receiving said reference signal from said source device; and
      2. an AND gate coupled to said counter circuit;
d. a line supplying said skew detection signal from said sink device to said source device; and
e. a line supplying said reference signal from said source device to said sink device.

16. The circuit of claim 15, and further comprising a line for supplying a synchronization signal between said counter circuits in said source device and said sink device.

17. The circuit of claim 15, wherein said skew detection circuit detects the skew of each of said N bits in said N bit digital data signal, generates N phase detection signals, each associated with one of said N bits in response thereto, and multiplexes said N phase detection signals as said skew detection signal.

18. The circuit of claim 15, wherein said source device is a high complexity integrated circuit, and said sink device is a low complexity integrated circuit.

19. The circuit of claim 15, wherein said high speed digital interface circuit operates in an initialization condition in which a digital initialization signal having bits of a first predefined unit length initializes said high speed digital interface circuit, and in an operating condition in which said N bits of said N bit digital data signal have a second predefined unit length, wherein said source device includes N AND gates, each associated with one of said N bits, for receiving said N bit digital data signal and said digital initialization signal, and wherein said first predefined unit length is greater than said second predefined unit length.

20. The circuit of claim 15, wherein said phase detectors in said sink device are correlator units for detecting the delay between each of the N bits of said N bit digital data signal and said reference signal.

21. The circuit of claim 15, wherein said sink device inserts a synchronization signal in said skew detection signal supplied to said source device, and wherein said source device includes a sync circuit for receiving said synchronization signal and synchronizing said counters in said source device and said sink device.

* * * * *